United States Patent [19]
Lammers

[11] 3,845,487
[45] Oct. 29, 1974

[54] RADIO DIRECTION FINDING SYSTEM

[76] Inventor: Uve H. W. Lammers, 5 San Mateo Dr., Chelmsford, Mass. 01824

[22] Filed: Sept. 26, 1972

[21] Appl. No.: 292,370

[52] U.S. Cl............................ 343/113 DE, 343/768
[51] Int. Cl................................................ G01s 3/52
[58] Field of Search............................. 343/113 DE

[56] References Cited
UNITED STATES PATENTS

| | | | |
|---|---|---|---|
| 2,411,518 | 11/1946 | Busignies...................... | 343/113 DE |
| 2,670,436 | 2/1954 | Dunbar............................ | 343/768 |
| 3,054,105 | 9/1962 | Steiner et al.................. | 343/113 DE |
| 3,208,068 | 9/1965 | Hoffman........................... | 343/768 |
| 3,490,023 | 1/1970 | Weisbrich, Jr................ | 343/113 DE |

Primary Examiner—Malcolm F. Hubler
Assistant Examiner—Richard E. Berger
Attorney, Agent, or Firm—Harry A. Herbert, Jr.; George Fine

[57] ABSTRACT

A radio direction finding system measures the angle of arrival of a distant-source signal using a moving receiving antenna or moving reflector from which first and second doppler shifted signals propagate along and against its direction of motion. Angular information is obtained by comparing the two signals. The position scan of the antenna is simulated.

2 Claims, 6 Drawing Figures

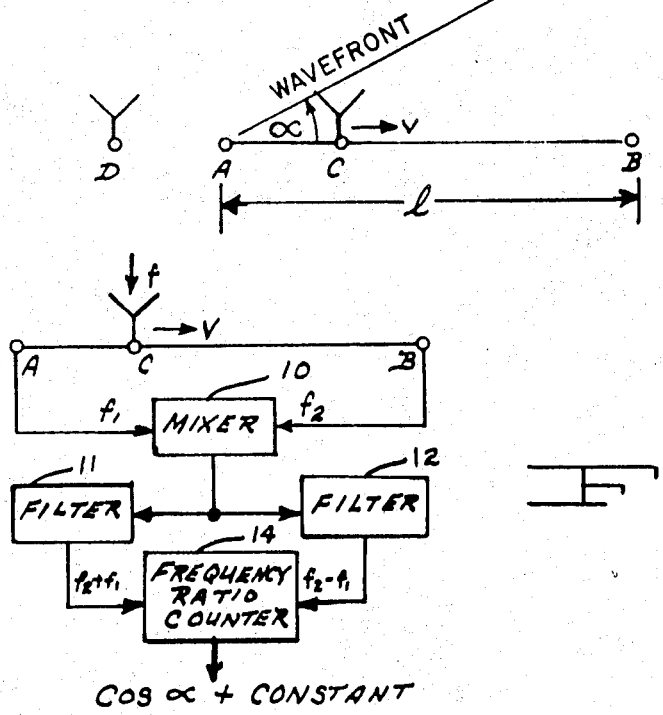

RADIO DIRECTION FINDING SYSTEM

BACKGROUND OF THE INVENTION

This invention relates to radio direction finding systems, and particularly to those systems which depend on the angle dependent doppler shift imposed on a distant-source signal when receiving it with an antenna which is in linear motion. The linear motion is simulated.

In many of the prior art systems of the type hereinbefore mentioned, detection of the angle-of-arrival of a distant-source signal utilized mechanical or electrical beam swinging. This requirement for mechanical or electrical beam swinging imposed limitations. The present invention does away with this requirement and substitutes therefore an antenna or reflector in linear motion (moving with a constant velocity). The antenna or reflector, for example, may be stationary or mounted on any moving object, either airborne, or on land or water. The linear motion of the antenna or reflector is simulated, for example, by a stationary waveguide having a moving slot.

SUMMARY OF THE INVENTION

A radio direction finding system is provided in which the angle-of-arrival of a distant source signal $f$ is measured. A moving antenna is simulated with the antenna receiving the distant source signal $f$ and in response thereto signals $f_1$ and $f_2$ propagate along and against the direction of motion of the antenna. Signals $f_1$ and $f_2$ are doppler shifted. Angular information is obtained by comparing the two doppler shifted signals $f_1$ and $f_2$ in two different modes. One includes the velocity of antenna motion $v$, the other depends on the transmitted frequency $f$.

DESCRIPTION OF THE DRAWINGS

FIG. 1 illustrates the basic principle of the invention;

FIG. 2 shows one embodiment of the invention in block diagram form;

DETAILED DESCRIPTION OF THE PREFERRED EMBODIMENT

Figure 3:
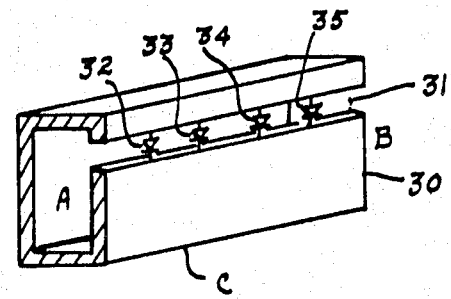
FIG. 3 illustrates a first stationary moving slot antenna.

Now referring in detail to FIG. 1, an antenna or reflector C is moving with constant velocity $v$ along the straight path $l$ from A to B. A plane wavefront from a distant source is arriving at the angle $\alpha$ with respect to the AB direction. The signal received by antenna C continues to propagate from antenna C to A and to B, where frequencies $f_1$ and $f_2$ respectively are received, which relate to the frequency $f$ of the distant transmitter as $$f_1 = f - v f/c \; 1 - \cos \alpha \qquad 1.$$

$$f_2 = f + v f/c \; (1 - \cos \alpha) \qquad 2.$$

Here $c$ is the propagation velocity of the signal. The angle of arrival $\alpha$ follows to be $$\cos \alpha = (f_2 + f_1/f_2 - f_1) - c/v \qquad 3.$$

With $c/v$ a known constant, only the ratio of the sum and difference of the doppler shifted signals at terminals A and B has to be determined.

The block diagram of FIG. 2 is an embodiment of the first detection system suggested by equation (3). The distant-source signal $f$ is received by antenna C which is moving with a constant velocity $v$. The linear motion of antenna C is simulated. The signal received by antenna C propagates from antenna C to terminal A and from antenna C to terminal B in the form of signal $f_1$ and $f_2$, respectively. Signals $f_1$ and $f_2$ are doppler shifted signals. Mixer 10 simultaneously receives signals $f_1$ and $f_2$ and provides an output to filters 11 and 12. Filter 11 is designed to provide an output of $f_2 + f_1$, and filter 12 an output of $f_2 - f_1$. Frequency ratio counter 14 receives simultaneously outputs $f_2 + f_1$ and $f_2 - f_1$ and provides an output of $\cos \alpha +$ a known constant. Thus there is provided in accordance with equation (3) the angle of arrival of the distant-source signal $f$ received at antenna C.

It is noted that the simulation of the motion of the antenna will be hereinafter described in conjunction with FIG. 3. It is also noted that frequency ratio counter 14 is a conventional type of frequency counter having two inputs and a single output.

FIG. 3 shows one embodiment of simulated linearly moving antenna C. Rectangular waveguide 30 is shown with longitudinal slot 31 over its whole length with an offset from the center in the waveguide wall so that the slot is capable of receiving an incoming signal $f$ according to the well understood principles of waveguide slot antennas. Slot 31 is short circuited over its whole length by a properly spaced series of diodes 32–35 across the slot. The diodes are sequentially switched such that an opening of the length of approximately half a wavelength is traveling along the slot. The distant source signal $f$ received by the slot propagates in both directions of the waveguide to provide signals $f_1$ and $f_2$ which are received at terminals A and B, respectively. The antenna shown in FIG. 3 is to be substituted for the antenna C shown in FIG. 2. Terminals A and B of FIG. 2 are equivalent to the terminals A and B, respectively, of FIG. 3. It is noted that a moving opening of a half wavelength is described hereinbefore. However, the diodes may be spaced substantially less than a half wavelength from each other and provide a smoother moving slot.

Figure 4:
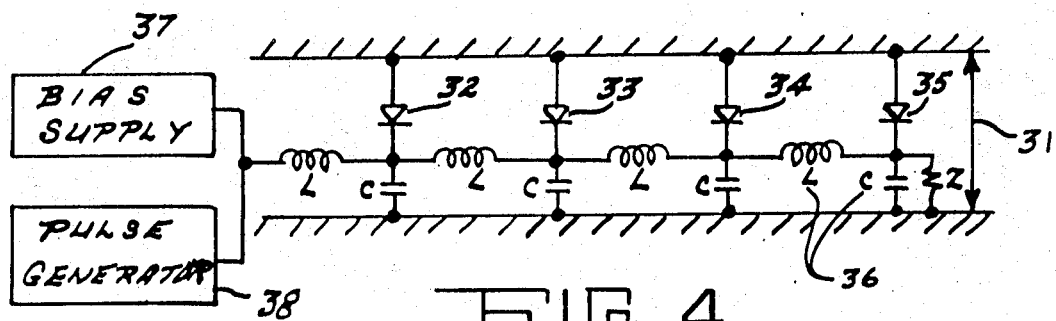
FIG. 4. shows the slot circuitry for FIG. 3 in which the diodes are switched sequentially.

FIG. 3 only symbolically indicates the position of the diodes 32–35 across slot 31. Their electrical connection and the sequential switching mechanism becomes obvious from FIG. 4. Here diodes 32–35 are connected with one terminal to one side of slot 31, while the other terminal is connected to equally spaced points along transmission line or delay line 36 mounted parallel to slot 31. The inductance and capacitance per unit length of this line are L respectively C. Diodes 32–35 are biased by direct current bias supply 37 so that they normally present a short circuit to the incoming wave. A pulse of proper amplitude and length generated by pulse generator 38 is superimposed on the bias in such a sense that while traveling along the line, it sequentially opens the diode short circuits. The transmission line or delay line is terminated by its characteristic impedance Z. Thus the switching pulse is absorbed at the end of the line.

Figure 5:
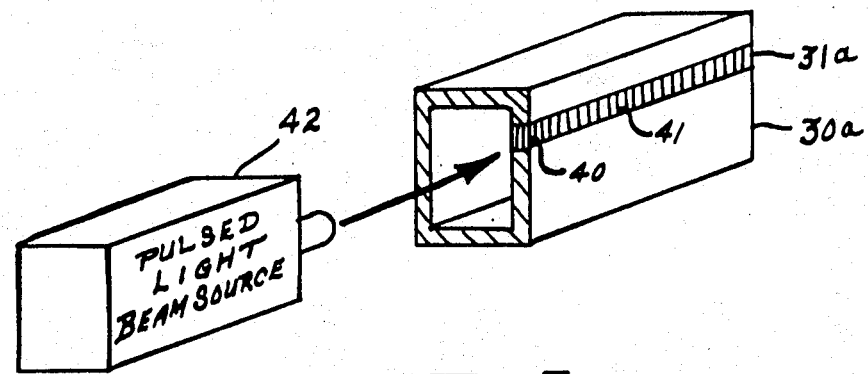
FIG. 5. shows a second stationary moving slot antenna.

Rather than using a diode arrangement for simulation of a moving slot, the same effect is obtained by mechanically moving shield or by filling the slot with a material that is made penetrable for the incoming wave by a localized acoustic, optic, electric or other stimulus moving along the slot. This is illustrated in the embodiment shown in FIG. 5. Waveguide slot 31a is filled with light guiding material 40 which on its outer surface indicated by hatching, carries conventional photosensitive layer 41. This layer is conductive and shorts the waveguide slot, whenever it is exposed to light. It is nonconductive and permits the incoming signal to penetrate into the waveguide when it is dark. A light stream supplied by pulsed light beam source 42 passing through light guiding material 40 produces a moving slot along waveguide 30a when interrupted for an appropriate time interval. The region of darkness propagates along the light guide.

The use of a passive moving reflector at C of FIG. 2 only requires that for all angles $\alpha$ it redirects a fraction of the energy impinging on it into the directions of terminals A and B.

What is claimed is:

1. A radio direction finding system depending on the angle dependent doppler shift imposed on a distant-source signal of frequency $f$ comprising a single antenna exclusively receiving said distant source signal, said single antenna having an electronically simulated motion, first and second doppler shifted signals of frequencies $f_1$ and $f_2$, respectively, propagating along and against the direction of motion of said single antenna, first and second terminals receiving said first and second doppler shifted signals, respectively, said single antenna being positioned between said first and second terminals, means to add only the frequencies $f_1$ and $f_2$ of said first and second doppler shifted signals, respectively, to obtain a second resultant frequency signal, and means to divide said first resultant frequency signal by said second resultant frequency signal to obtain the angle of arrival measurement.

2. A radio direction finding system as described in claim 1 wherein said single antenna is comprised of a stationary waveguide having a slot along the length thereof, a multiplicity of diodes equally spaced at a predetermined distance from each other along said slot and connected between said slot and ground, said diodes normally presenting a short circuit to the incoming signals, and means to sequentially open the diode short circuits, each of said diode short circuits being open for a predetermined length of time to simulate motion along said slot.

* * * * *